(12) United States Patent
Chen

(10) Patent No.: US 6,498,458 B1
(45) Date of Patent: Dec. 24, 2002

(54) BATTERY CHARGER FOR CHARGING A WIRELESS SIGNAL SOURCE AND DETACHABLE RECEIVER

(76) Inventor: Cliff Chen, 4F, No.22, Sec.6, Hsin I Rd., Taipei (TW)

( * ) Notice: Subject to any disclaimer, the term of this patent is extended or adjusted under 35 U.S.C. 154(b) by 0 days.

(21) Appl. No.: 09/985,108

(22) Filed: Nov. 1, 2001

(51) Int. Cl.[7] .............................................. H01M 10/46
(52) U.S. Cl. ...................................... 320/114; 320/115
(58) Field of Search ................................ 320/107, 110, 320/112, 113, 114, 115

(56) References Cited

U.S. PATENT DOCUMENTS 5,945,981 A * 8/1999 Paull et al.
5,983,073 A * 11/1999 Ditzik
6,255,800 B1 * 7/2001 Bork
6,380,714 B1 * 4/2002 Chou

* cited by examiner

Primary Examiner—Edward H. Tso
(74) Attorney, Agent, or Firm—Rosenberg, Klein & Lee

(57) ABSTRACT

A battery charger and receiver arrangement is constructed to include a battery charger adapted for charging the battery of a wireless signal source, the battery charger having a cable for connection to a computer and an electric female connector, and a detachable receiver adapted for receiving signal from the wireless signal source to be charged by the battery charger and transmitting received signal to the computer through the cable of the battery charger, the receiver having an electric male connector connectable to the electric female connector of the battery charger for transmission of signal to the computer through the cable of the battery charger.

14 Claims, 5 Drawing Sheets

BATTERY CHARGER FOR CHARGING A WIRELESS SIGNAL SOURCE AND DETACHABLE RECEIVER

BACKGROUND OF THE INVENTION

The present invention relates to a battery charger and, more specifically, to a battery charger and receiver system, which enables the receiver to be used with the battery charger to transmit signal from a wireless signal source to a computer to which the battery charger is connected, or separated from the battery charger for use with a computer to receive signal from a wireless signal source.

Following fast development of computer technology, a variety of peripheral apparatus are created for with a computer. When several computer peripheral apparatus are used and connected to a computer by a respective cable, the cables may be tangled with one another. Further, the cable limits the moving range of the respective peripheral apparatus relative to the computer. In order to eliminate these problems, wireless communication is developed. Various wireless keyboards and mice have been disclosed, and have appeared on the market. There are also known battery chargers adapted for charging the battery of a wireless mouse. FIG. 1 shows a battery charger 3' adapted for use with a notebook computer 1' and a wireless mouse 5'. The wireless mouse 5' comprises a charging circuit, a transmitting circuit, and a battery. The battery charger 3' comprises a circuit 32', a charging chamber 31' adapted for receiving the wireless mouse 5', charging contacts 33' fixedly provided in the charging chamber 31' and connected to the circuit 32' for output of charging power to the charging circuit of the wireless mouse 5', a receiver 2' connected to the circuit 32' and adapted for receiving signal from the wireless mouse 5', and a cable 34' extended from the circuit 32' and terminating in a USB plug 35' adapted for connecting to an electric female connector, for example, a USB socket 11' of the notebook computer 1'. Further, an AC adapter 4' is provided for connection to city power supply. The AC adapter 4' is adapted for converting AC power supply into the desired DC power supply for the battery charger 3', having a cable 41' for connection to a power input jack of the battery charger 3'. This structure of battery charger 3' is functional. However, because the receiver 2' is built in the battery charger 3', it is not detachable. When using the wireless 5' with another computer or a computer in another place, the battery charger 3' must be disconnected from the notebook computer 1' and then installed in the other computer to be used.

SUMMARY OF THE INVENTION

The present invention has been accomplished under the circumstances in view. It is the main object of the present invention to provide a battery charger, and a detachable receiver that can be installed in the battery charger for communication between a wireless mouse and the computer to which the battery charger is connected, or detached from the battery charger for use with another computer.

To achieve these and other objects of the present invention, the battery charger and receiver arrangement comprises a battery charger, the battery charger comprising a charging chamber adapted for charging a wireless signal source, for example, a wireless mouse, wireless joystick, or remote controller, an electric female connector (of USB or PS/2 specification), and an electric plug cable (of USB or PS/2 specification) electrically extended from the electric female connector adapted for connecting to a computer for transmitting signal from the electric female connector to the computer; and a receiver adapted for receiving signal from the wireless signal source to be charged by the battery charger, the receiver having an electric male connector (of USB or PS/2 specification) adapted for connection to the electric female connector (of USB or PS/2 specification) of the battery charger for enabling received signal from the wireless signal source to be charged by the battery charger to be transmitted to the computer to which the electric plug cable is connected.

DETAILED DESCRIPTION OF THE PREFERRED EMBODIMENT

Figure 1:
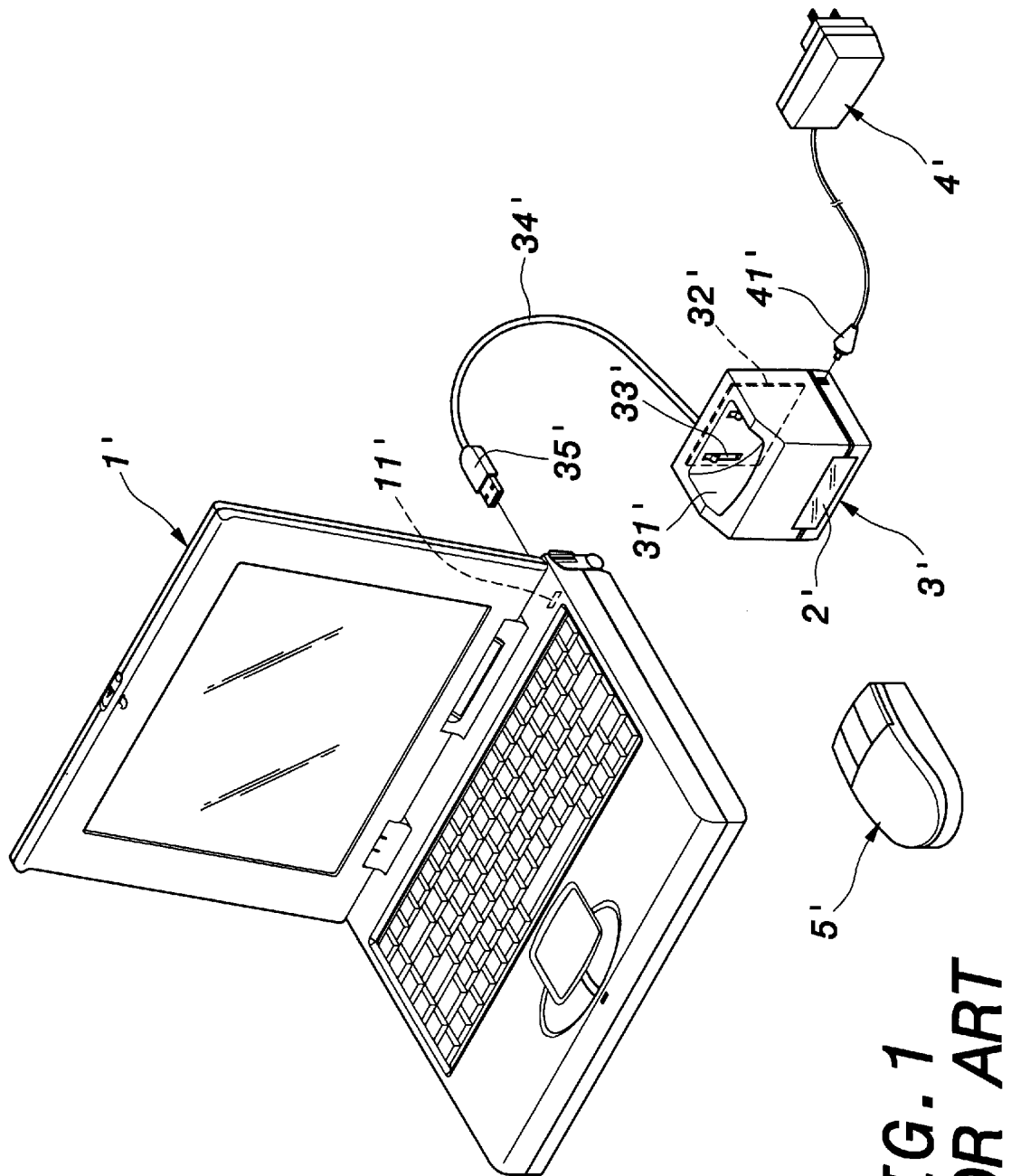
FIG. 1 illustrates the use of a battery charger with a notebook computer and a wireless mouse according to the prior art.
Figure 2:
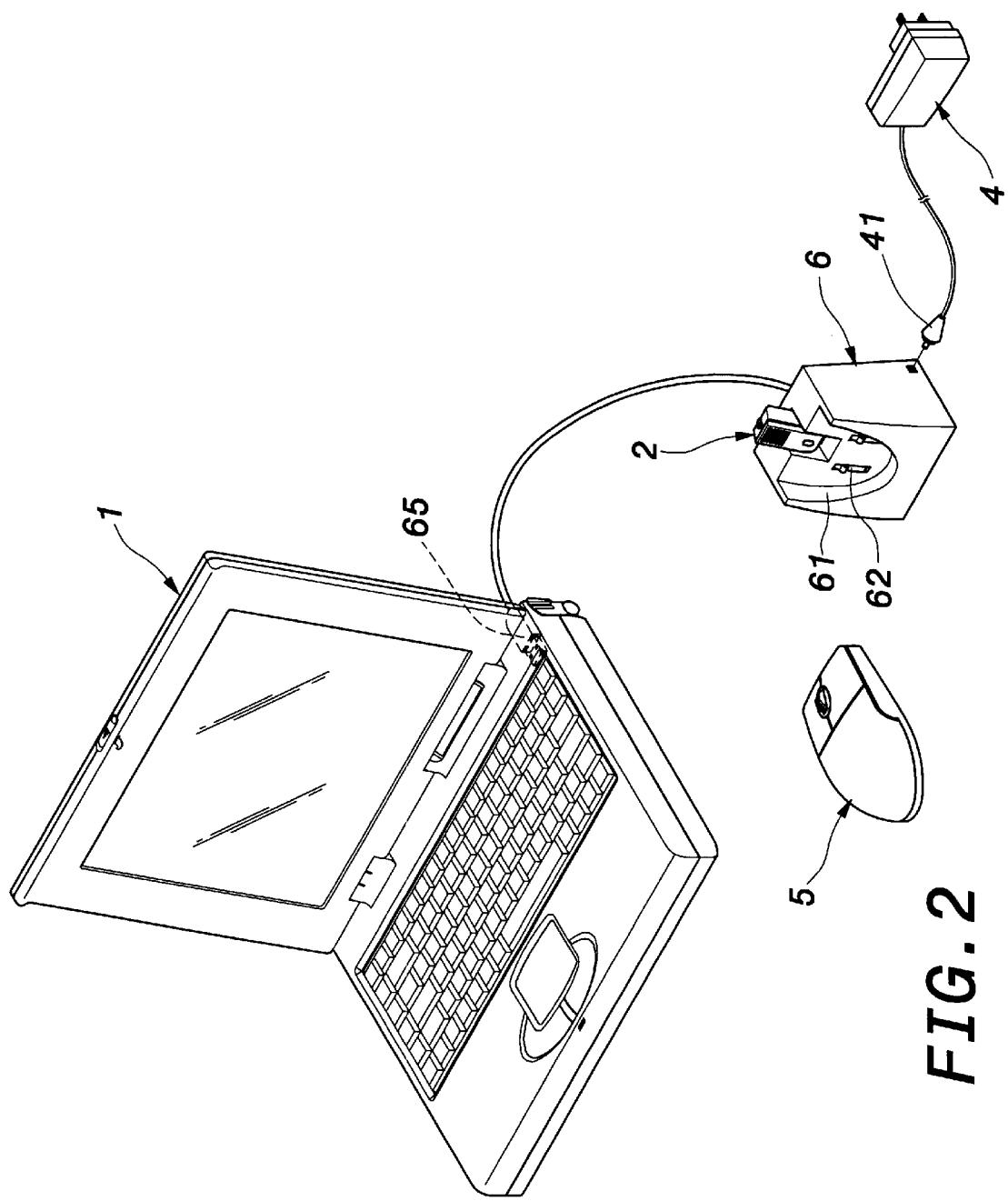
FIG. 2 is a perspective view of the present invention showing the battery charger connected to a notebook computer, the receiver installed in the battery charger.
Figure 3:
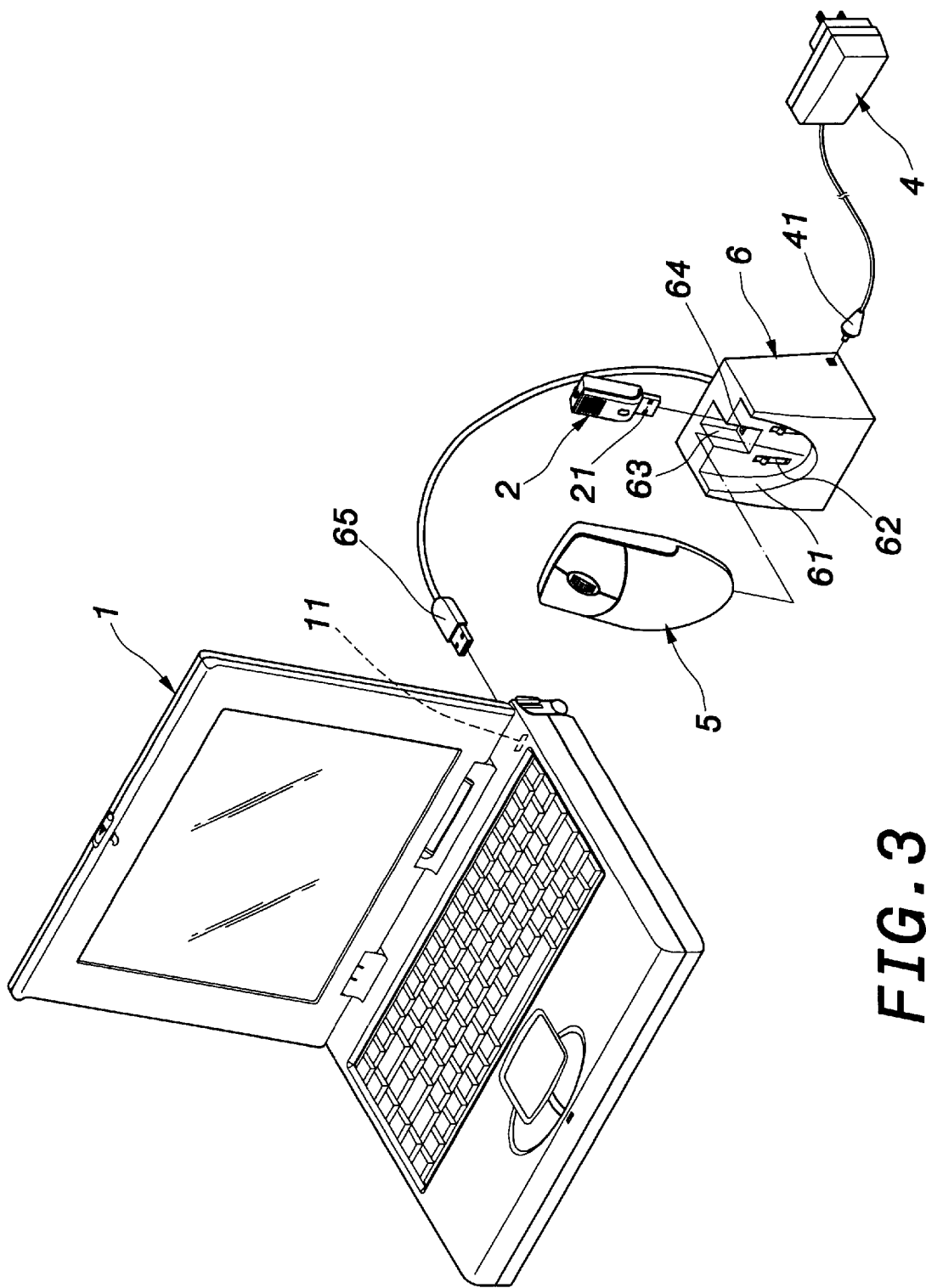
FIG. 3 is an exploded view of the present invention, showing the cable of the battery charger disconnected from the notebook computer, the receiver disconnected from the battery charger.

Referring to FIGS. 2 and 3, a battery charger 6 is shown comprising a charging chamber 61, and two charging contacts 62 fixedly provided in the charging chamber 61 and connected to the internal circuit (not shown) of the battery charger 6. The battery charger 6 further comprises a top insertion hole 63 adapted for receiving a receiver 2, an electric female connector, for example, USB or PS/2 socket 64 embedded in the top insertion hole 63 and electrically connected to the internal circuit of the battery charger 6. The top insertion hole 63 is adapted for receiving a receiver 2, having a front side in communication with the inside space of the charging chamber 61. Further, an AC adapter 4 is provided and adapted for converting AC power into the desired DC power for the battery charger 6, having a cable 41 for connection to (a power input jack of) the wireless battery charger 6 to provide DC power to the internal circuit of the wireless battery charger 6.

The receiver 2 can be regarded as a module fitting the top insertion hole 63 of the battery charger 6, having an electric male connector, for example, USB or PS/2 plug 21 adapted for connecting to the electric female connector (USB or PS/2 socket) 64 of the battery charger 6. The battery charger 6 further comprises a (USB or PS/2 plug) cable 65 extended from the internal circuit and adapted for connecting to an electric connector (USB or PS/2 socket) 11 of a notebook computer 1.

After connection of the cable 65 of the battery charger 6 to the electric female connector (USB or PS/2 socket) 11 of the notebook computer 1, the receiver 2 is inserted into the top insertion hole 63 of the battery charger 6 to force the electric male connector 21 into connection with the electric female connector 63 of the battery charger 6. After installation of the receiver 2 in the battery charger 6, the output (infrared or radio) signal of the wireless mouse 5 is received by the receiver 2, and then transmitted through the cable 65 to the notebook computer 1 to control the cursor on the display screen of the notebook computer 1. When charging the battery of the wireless mouse 5, the wireless mouse 5 is inserted into the charging chamber 61 of the battery charger 6, enabling charging power to be transmitted from the charging contacts 62 of the battery charger 6 into the charging circuit of the wireless mouse 6 to charge the battery of the wireless mouse 6. When wishing to carry the receiver 2 for use with another computer or a computer in another place, the receiver 2 is disconnected from the electric female connector (USB or PS/2 socket) 64 of the battery charger 6. After removal from the electric female connector (USB or PS/2 socket) 64 of the battery charger 6, the receiver 2 can be installed in the electric female connector (USB or PS/2 socket) of another battery charger of the same type or the electric female connector (USB or PS/2 socket) of another computer for wireless operation.

In the aforesaid design, the top insertion hole 63 is in communication with the charging chamber 61, so that the receiver 2 can positively receive signal from the wireless mouse 5 when inserted in the top insertion hole 63 of the battery charger 6 and connected to the electric female connector (USB or PS/2 socket) 64.

Figure 4:
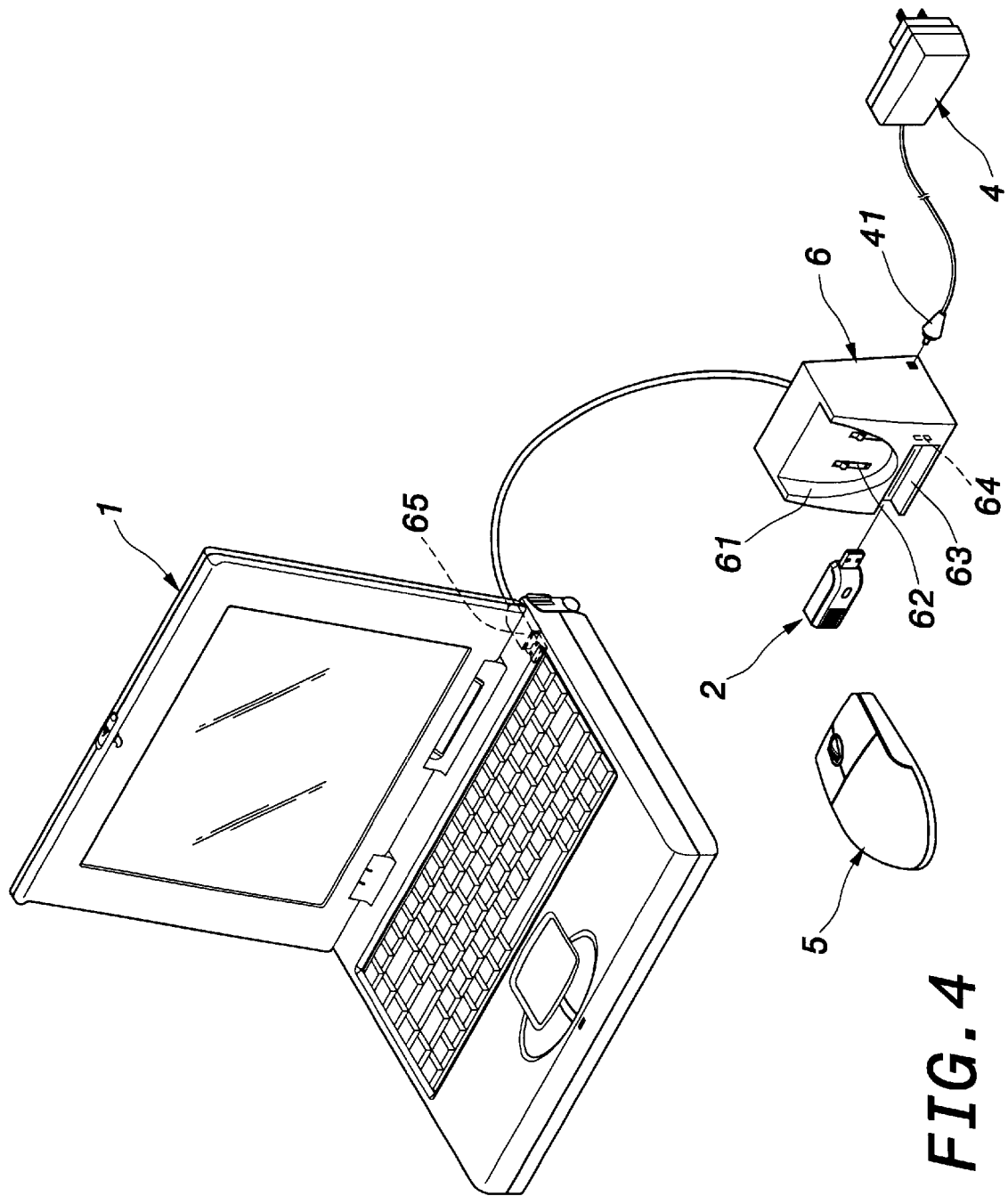
FIG. 4 shows an alternate form of the present invention.

FIG. 4 shows an alternate form of the present invention. According to this alternate form, the insertion hole 63 is transversely disposed in the front sidewall of the battery charger 6 beneath the charging chamber 61 and extended to one lateral sidewall of the battery charger 6, the electric female connector (USB or PS/2 socket) 64 is installed in the inner end of the insertion hole 63. When the receiver 2 is inserted into the insertion hole 63 and electrically connected to the electric female connector (USB or PS/2 socket) 64, it faces the wireless mouse 5 and can receive signal from the wireless mouse 5 freely.

Alternatively, the insertion hole 63 can be formed in the front sidewall, either one of the two lateral sidewalls, or any suitable location of the battery charger 6. In any case, the installation of the receiver 2 in the insertion hole 63 does not affect the functioning of the receiver 2 of receiving signal from the wireless mouse 5.

Figure 5:
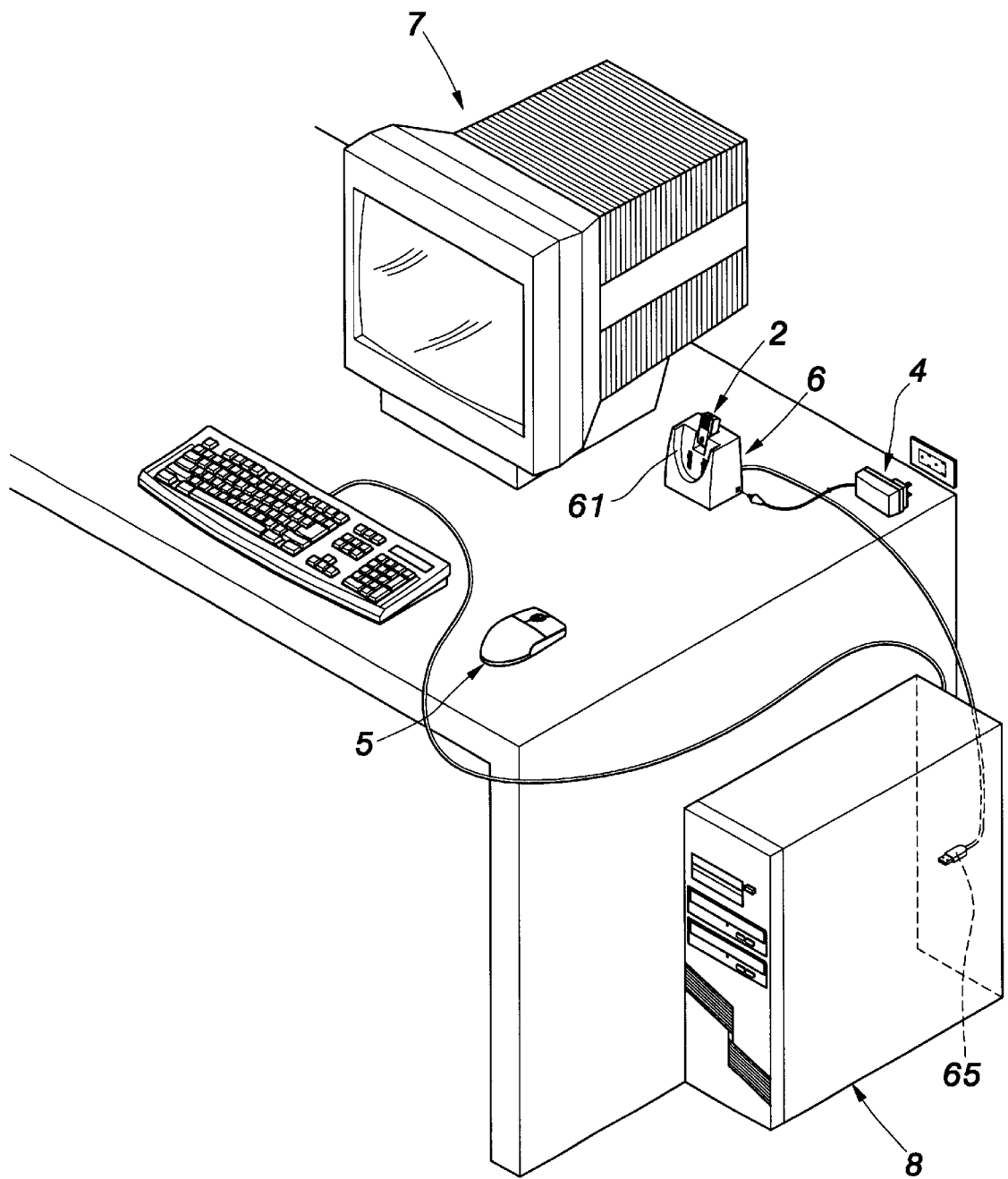
FIG. 5 shows another application example of the present invention.

FIG. 5 shows another application example of the present invention. As illustrated, the mainframe 8 of the computer system is positioned on the floor, the monitor 7, and the wireless mouse 5 (as well as the keyboard) of the computer system are placed on the desk at one side of the host computer 8. The battery charger 6 is placed on the desk with the (USB or PS/2 plug) cable 65 electrically connected to the host computer 8, and the AC adapter 4 is adapted for obtaining power from an AC electric outlet so as to provide the necessary working voltage to the battery charger 6. The receiver 2 is installed in the battery charger 6 and adapted for receiving signal from the wireless mouse 5 and transmitting received signal to the host computer 8. In this case, the receiver 2 cannot be directly installed in (USB or PS/2 socket of) the host computer 8 to receive signal from the wireless mouse 5 because the wireless mouse 5 and the host computer 8 are not disposed at the same elevation.

The aforesaid embodiments show applications of the present invention for transmitting signal from a wireless mouse to a computer (notebook computer or desktop computer). The invention can also be designed for use to charge the battery of a wireless joystick, remote controller, or any of a variety of wireless peripheral apparatus.

As indicated above, the receiver 2 has an electric male connector (USB or PS/2 plug) 21 for connection to the electric female connector (USB or PS/2 socket) 64 of the battery charger 6, or the electric female connector (USB or PS/2 socket) of a personal computer, the receiver 2 can be used with the battery charger 6 or any of a variety of computers or computer peripheral apparatus having an electric female connector (USB or PS/2 socket).

A prototype of battery charger has been constructed with the features of the annexed drawings of FIGS. 2~5. The battery charger functions smoothly to provide all of the features discussed earlier.

Although particular embodiment of the invention have been described in detail for purposes of illustration, various modifications and enhancements may be made without departing from the spirit and scope of the invention. Accordingly, the invention is not to be limited except as by the appended claims.

What the invention claimed is:

1. A battery charger and receiver arrangement comprising:
   a battery charger, said battery charger comprising a charging chamber adapted for charging a wireless signal source, an electric female connector, and an electric plug cable electrically extended from said electric female connector adapted for connecting to a computer for transmitting signals from said electric female connector to the computer; and
   a detachable receiver adapted for receiving signals from the wireless signal source to be charged by said battery charger, said receiver having an electric male connector adapted for connection to the electric female connector of said battery charger for enabling received signals from the wireless signal source to be transmitted to the computer to which said electric plug cable is connected and to charge said receiver.

2. The battery charger and receiver arrangement as claimed in claim 1 wherein said electric male connector of said receiver is a USB plug, said electric female connector of said battery charger is a USB socket, and said electric plug cable is USB plug cable for connection to a USB socket of a computer.

3. The battery charger and receiver arrangement as claimed in claim 1 wherein said electric male connector of said receiver is a PS/2 computer plug, said electric female connector of said battery charger is a PS/2 computer socket, and said electric plug cable is a PS/2 computer plug cable for connection to a PS/2 computer socket.

4. The battery charger and receiver arrangement as claimed in claim 1 wherein the computer to which said electric plug cable connected is a notebook computer.

5. The battery charger and receiver arrangement as claimed in claim 1 wherein the computer to which said electric plug cable connected is a desktop computer.

6. A battery charger and receiver arrangement comprising:
   a battery charger, said battery charger comprising a charging chamber adapted for charging a wireless signal source, an electric female connector, and an electric plug cable electrically extended from said electric female connector adapted for connecting to a computer for transmitting signals from said electric female connector to the computer; and
   a receiver adapted for receiving signals from the wireless signal source to be charged by said battery charger, said receiver having an electric male connector adapted for connection to the electric female connector of said battery charger for enabling received signals from the wireless signal source to be transmitted to the computer to which said electric plug cable is connected and to charge said receiver, said battery charger including an insertion hole into which said receiver is inserted and connected to the electric female connector of said battery charger.

7. The battery charger and receiver arrangement as claimed in claim 6 wherein said insertion hole is disposed in a top side of said battery charger, and the electric female connector of said battery charger is installed in a bottom end of said insertion hole.

8. The battery charger and receiver arrangement as claimed in claim 6 wherein said insertion hole is an open chamber formed in a front sidewall of said battery charger and extended to one lateral side of said battery charger, and the electric female connector of said battery charger is installed in an inner end of said insertion hole.

9. The battery charger and receiver arrangement as claimed in claim 8 wherein said insertion hole is disposed near a bottom side of said battery charger.

10. The battery charger and receiver arrangement as claimed in claim 6 wherein said insertion hole is formed in a front sidewall of said battery charger 11. The battery charger and receiver arrangement as claimed in claim 1 wherein said receiver is adapted for receiving signal from a wireless mouse.

12. The battery charger and receiver arrangement as claimed in claim 1 wherein said receiver is adapted for receiving signal from a wireless keyboard.

13. The battery charger and receiver arrangement as claimed in claim 1 wherein said receiver is adapted for receiving signal from a wireless joystick or joypad.

14. The battery charger and receiver arrangement as claimed in claim 1 wherein said receiver is adapted for receiving signal from a remote controller.

* * * * *